Aug. 26, 1969   J. J. WUSTENEY   3,463,382
MEANS FOR OPERATING AIR COMPRESSORS IN
PARALLEL WITH ALTERNATE LEAD
DUTY CYCLING
Filed April 11, 1967

Inventor
John J. Wusteney
By Thomas F. Kirby
Attorney

United States Patent Office 3,463,382
Patented Aug. 26, 1969

3,463,382
MEANS FOR OPERATING AIR COMPRESSORS IN PARALLEL WITH ALTERNATE LEAD DUTY CYCLING
John J. Wusteney, Stoughton, Mass., assignor to Allis-Chalmers Manufacturing Company, Milwaukee, Wis.
Filed Apr. 11, 1967, Ser. No. 630,092
Int. Cl. F04b 49/06, 49/02
U.S. Cl. 230—2    2 Claims

ABSTRACT OF THE DISCLOSURE

A system for supplying compressed air to operate an air blast electric circuit breaker comprises a pair of air compressors. Each compressor is driven by its own motor which is controlled by its own motor controller. Two pressure responsive switches and a sequence relay having a pair of contacts control operation of the motor controllers so that first one and then the other of the compressors has the "lead duty" and "lag duty." For example, if system pressure is below 2400 p.s.i., both pressure switches are closed and one sequence relay contact is closed and both compressors operate. When pressure reaches 2800 p.s.i., one pressure switch opens and one compressor stops. At 3000 p.s.i., the other pressure switch opens and the other compressor stops. When pressure falls to 2600 p.s.i., the last mentioned pressure switch closes thereby causing the said one sequence relay contact to open and the other to close thereby causing the said one compressor to start up and operate until system pressure reaches 3000 p.s.i. If pressure drops to 2400 p.s.i., both compressors operate till it reaches 2800 p.s.i. and then the said other compressor continues until 3000 p.s.i. is reached.

Summary of the invention

This invention relates generally to a control system for operating two machines, such as air compressors, in parallel so that first one and then the other has the lead duty in successive operations.

In the electrical industry, air blast circuit breakers require high pressure air for operation and depend on a supply of compressed air being continually available. Usually, two air compressors are employed at each installation as a precautionary measure. Heretofore, it was the practice to provide a control system whereby a human operator manually operated a transfer switch to select which of two compressors would lead (start up first) and which would lag (start up last) in the event that system air pressure dropped below predetermined levels. As a consequence, compressor running times had to be closely observed and accurate records kept to insure uniform duty and even wear on both compressors and other components.

In accordance with the present invention, there is provided a control system wherein the aforementioned manually operated transfer switch is replaced by a sequence relay and other components, such as motor controller auxiliary contacts, which automatically and alternatively select which of the two compressors leads and lags.

Objects

It is an object of the present invention to provide improved means for operating a plurality of air compressors in parallel so that each of the compressors has the "lead" duty cycle.

Another object is to provide improved means of the aforesaid character which employ a sequence relay and other components to automatically effect alernative operation of the compressors.

Other objects and advantages of the invention will hereinafter appear.

Description of the views of the drawing

The accompanying drawing illustrates a preferred embodiment of the invention but it is to be understood that the embodiment illustrated is susceptible of modifications with respect to details without departing from the scope of the appended claims.

In the drawing.

Detailed description of the prior art

Figure 1:
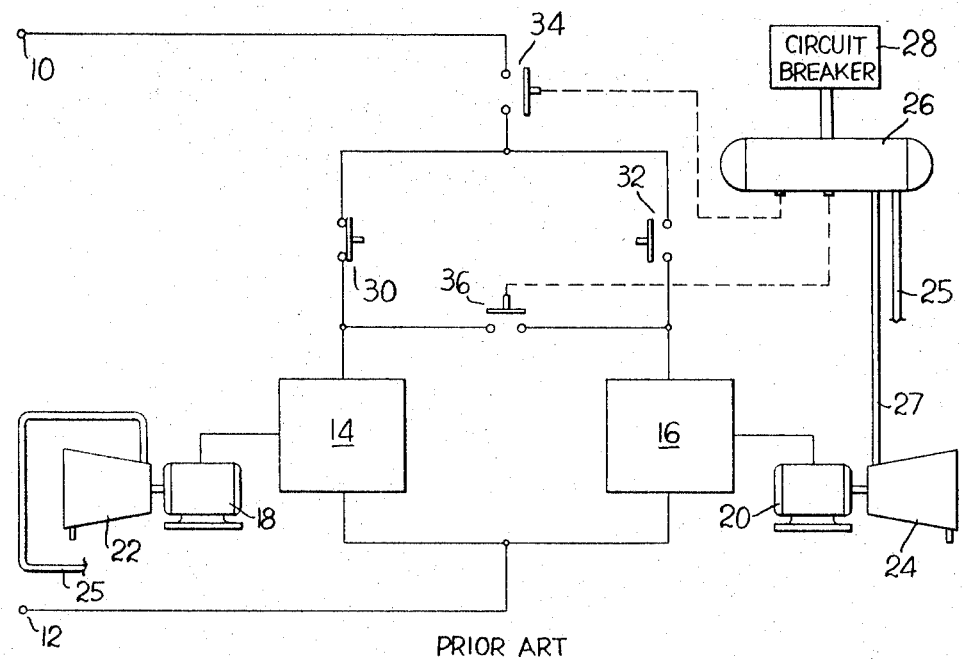
FIG. 1 is a schematic showing of a prior art control system for operating a pair of compressors in parallel.

Referring to FIG. 1 which shows a prior art control system for operating a pair of compressors in parallel, the numerals 10 and 12 designate the output terminals of, for example, an alternating current power supply source. The power source is adapted to energize two controllers 14 and 16 which control two motors 18 and 20, respectively, which drive two compressors 22 and 24, respectively. The compressors 22 and 24 both supply compressed gas, such as air, through pipes 25 and 27, respectively, to a reservoir or an air supply system 26 which, for example, is used to operate an air blast circuit breaker 28.

In FIG. 1, it is to be understood that connection of either controller 14 or 16 across the power supply source terminals 10 and 12 by closure of the appropriate series connected switch contacts effects energization of motor 18 or 20, respectively, and consequent operation of compressor 22 or 24, respectively.

Manual transfer switches 30 and 32 are provided to enable selection of either one compressor or the other for the "lead duty," as hereinafter explained.

Pressure responsive switches 34 and 36 are provided to respond to pressure conditions in system 26 and are suitably connected thereto. Specifically, switch 34 is adapted to close when pressure in system 26 drops to a predetermined lower level (for example, 2600 p.s.i.) and to open when the pressure in the system is raised to a predetermined upper level (for example, 3000 p.s.i.). Switch 36 is adapted, for example, to close when pressure drops to 2400 p.s.i. and to open when pressure is raised to 2800 p.s.i.

Controller 14 is connectable across source terminals 10 and 12 through switches 30 and 34. Controller 16 is connectable across source terminals 10 and 12 through switches 32 and 34. Pressure switch 36 has one side connected between switch 30 and controller 14 and has its other side connected between sequence contact 32 and controller 16.

The prior art control system shown in FIG. 1 operates as follows. Assume that initially switches 30 and 32 are open and that the compressor motors are deenergized and that pressure in system 26 is atmospheric or, at least, below 2400 p.s.i. With such pressure conditions both switches 34 and 36 are closed. Assume that compressor 22 is selected for the "lead duty" to bring system 26 up to 3000 p.s.i. pressure and that switch 30 is, therefore, closed manually. Closure of switch 30 establishes a circuit from terminal 10, through switch 34, switch 30, switch 36, and through both controllers 14 and 16 to terminal 12. With both controllers 14 and 16 connected across the power supply source, the motors 18 and 20, respectively, are understood to be energized and the compressors 22 and 24, respectively, are in operation.

As pressure builds up in system 26 and reaches 2800 p.s.i., switch 36 opens to disconnect controller 16, deenergize motor 20, and stop compressor 24. When the pressure reaches 3000 p.s.i., switch 34 opens to disconnect controller 14, deenergize motor 18, and stop compressor 22.

If pressure in system 26 drops due either to operation of circuit breaker 28 or leakage in the system, then switch 34 closes when pressure falls to 2600 p.s.i. Closure of switch 34 (with switch 30 already closed) connects controller 14 across the source and causes operation of compressor 22, as hereinbefore explained, to bring the pressure up to the desired level. As long as switch 30 is closed and switch 32 is open, compressor 22 will be the "lead duty" compressor and compressor 24 will come into play only if pressure falls below 2400 p.s.i.

In order for compressor 24 to assume the "lead duty," switch 30 must be opened and switch 32 closed. This is disadvantageous because compressor running time needs to be closely observed and accurate records kept to insure uniform duty and even wear on the compressors and other components.

Detailed description of the invention

Figure 2:
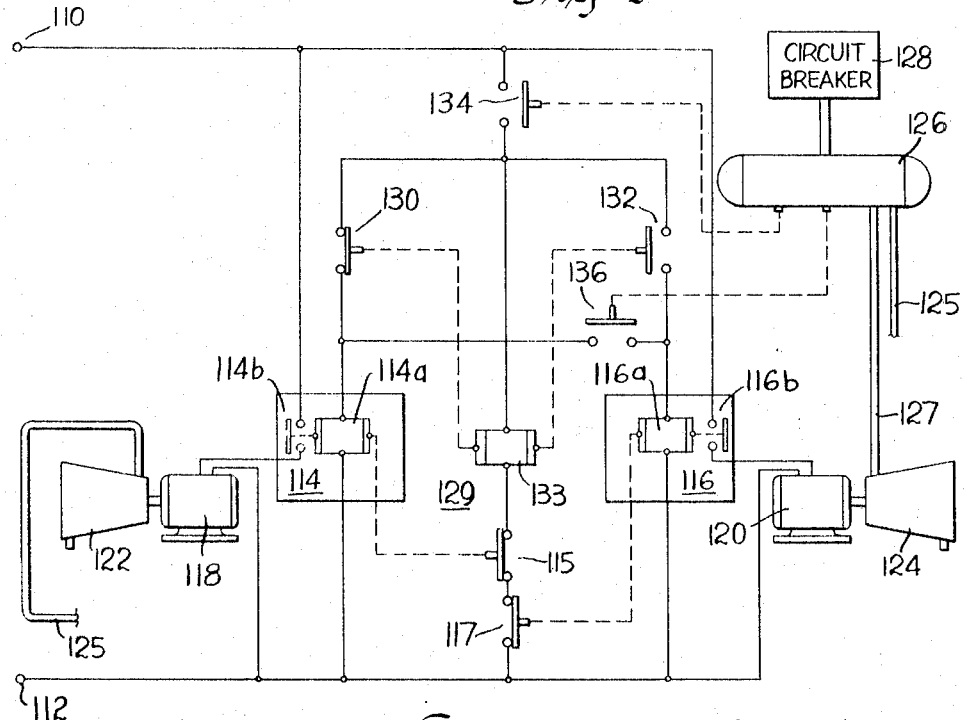
FIG. 2 is a schematic showing of a control system in accordance wtih the present invention.

Referring to FIG. 2 which shows a control system for operating a pair of compressors in accordance with the present invention, the numerals 110 and 112 designate the output terminals of, for example, an alternating current power supply source. The power source is adapted to energize the solenoid coils of two controllers 114 and 116 which control two motors 118 and 120, respectively, which drive two compressors 122 and 124, respectively. The compressors 122 and 124 both supply compressed gas, such as air, through pipes 125 and 127 to an air supply system 126 which, for example, is used to operate an air blast circuit breaker 128.

Controller 114 comprises, for example, a solenoid 114a for controlling a motor starter contact 114b and an auxiliary contact 115. Solenoid 114a is connected in circuit between terminal 112 and a sequence relay contact 130. Starter contact 114b is connected in circuit with motor 118 across the terminals 110 and 112. Controller 116 comprises, for example, a solenoid 116a for controlling a motor starter contact 116b and an auxiliary contact 117. Solenoid 116a is connected in circuit between terminal 112 and a sequence relay contact 132. Starter contact 116b is connected in circuit with motor 120 across the terminals 110 and 112.

It is to be understood that connection of either solenoid 114a or 116a of either controller 114 or 116, respectively, across the power supply source terminals 110 and 112 by closure of the appropriate series connected switch contacts effects energization of motor 118 or 120, respectively, and consequent operation of compressors 122 or 124, respectively.

In accordance with the present invention, selection of either one compressor or the other for the "lead duty" is accomplished automatically partly as a result of the operation of a sequence relay 129 in accordance with the present invention. Sequence relay 129 comprises the pair of switching contacts 130 and 132 which are rapidly movable to open and closed positions alternately by means of a solenoid coil 133, as hereinafter explained. It is to be understood that the contacts in sequence relay 129 are mechanically latched in the position they assumed when coil 133 is deenergized. A suitable sequence relay for use with the present invention is the Type C85AXA sequence relay manufactured by Struthers-Dunn, Incorporated of Pitman, N.J. and shown in their catalogue KS-D on page 22.

Pressure responsive switches 134 and 136 are provided to respond to pressure conditions in system 126 and are suitably connected thereto. Specifically, switch 134 is adapted to close when pressure in system 126 drops to a predetermined lower level (for example, 2600 p.s.i.) and to open when the pressure in the system is raised to a predetermined upper level (for example, 3000 p.s.i.). Switch 136 is adapted to close, for example, when system pressure drops to 2400 p.s.i. and to open when system pressure is raised to 2800 p.s.i.

Solenoid coil 133 of sequence relay 129 is connected on one side to source terminal 110 through pressure switch 134 and is connected on its other side to source terminal 112 through the pair of series connected contacts 115 and 117. It is to be understood that the contacts 115 and 117 are auxiliary contacts associated with the controllers 114 and 116, respectively, and that when the motor starts, the motor starter contacts in a respective controller 114 or 116 are open, then the respective auxiliary contact 115 or 117, respectively, is closed and vice versa.

The solenoid 114a of controller 114 is connectable across source terminals 110 and 112 through pressure switch 134 and sequence contacts 130. The solenoid 116a of controller 116 is connectable across source terminals 110 and 112 through pressure switch 134 and sequence contacts 132. Pressure switch 136 has one side connected between sequence contact 130 and controller 114 and has its other side connected between sequence contact 132 and controller 116.

The control system in accordance with the present invention shown in FIG. 2 operates as follows. Assume that initially contact 130 of sequence relay 129 is mechanically latched closed and that contact 132 is open, as FIG. 2 shows. Assume further that the pressure in system 126 is atmospheric or at least below 2400 p.s.i. and that, therefore, pressure switches 134 and 136 are closed. In this condition, the solenoids of both controllers 114 and 116 are connected across the power supply source and both compressors 122 and 124 are in operation. Since both solenoids are connected, both contacts 115 and 117 are understood to be open and solenoid coil 133 of sequence relay is deenergized (with contact 130 latched closed and 132 latched open).

As pressure builds up in system 126 and reaches 2800 p.s.i., switch 136 opens to disconnect controller 116, deenergize motor 120, and stop compressor 124. Disconnection of controller 116 causes contact 117 to close. When the pressure reaches 3000 p.s.i., pressure switch 134 opens to disconnect controller 114, deenergize motor 118, and stop compressor 122. Disconnection of controller 114 causes contact 115 to close.

If pressure in system 26 drops due either to operation of circuit breaker 128 or leakage in the system, then switch 134 closes when pressure falls to 2600 p.s.i. Closure of switch 134 (with switch 130 already closed and with contacts 115 and 117 both closed) energizes the solenoid coil 133 of sequence relay 129. Since, however, sequence contact 130 is initially closed, controller 114 is momentarily energized but the fast operation of sequence relay 129 opens its contact 130 and closes its contact 132. Opening of contact 130 deenergizes controller 114 immediately. Closure of contact 132 connects controller 116 across the power source, energizes motor 120 and starts compressor 124. When controller 116 is connected across the power source, auxiliary contact 117 opens and deenergizes the solenoid 133 of sequence relay 129. As will be understood, contact 132 is mechanically latched in closed condition and remains closed. Thus, compressor 124 is now the "lead" compressor and raises the system pressure to 3000 p.s.i. where contact 134 opens to disconnect controller 116 and stop compressor 124.

The next time the system pressure drops to 2600 p.s.i., pressure switch 134 closes and controller 116 is momentarily connected. However, coil 133 of sequence relay 129 remains connected across the source sufficiently long before contact 117 can open so that contact 132 opens and contact 130 closes and is mechanically held. The operation of sequence relay 129 is, therefore, the reverse of that previously described herein. With switch 134 closed and contact 130 closed, controller 114 is connected and compressor 122 operates and becomes the "lead" compressor. Auxiliary contacts 115 open to deenergize coil 133.

If system pressure drops to 2400 p.s.i., pressure switch 136 closes and the "lag" compressor 124 is also brought into operation. At 2800 p.s.i., pressure switch 136 again opens and the lag compressor 124 stops.

The embodiments of the invention in which an exclusive property or privilege is claimed are defined as follows:

1. In a system containing a gas,
a pair of compressors for maintaining said gas at a predetermined pressure,
each compressor being driven by a motor and each motor having a motor controller, each controller having an auxiliary contact,
an electric power supply source for energizing said controllers to effect operation of said motors,
a sequence relay for controlling said motor controllers, said relay comprising an energizable coil and a pair of sequence contacts, one of said sequence contacts being closed when the other is open and vice versa,
one side of said relay coil being connected to one side of said source through a pressure switch which closes when said pressure drops to a first pressure level and opens when said pressure increases to a second level which is greater than said first level,
the other side of said relay coil being connected to the other side of said source through said pair of series connected normally closed auxiliary contacts,
one of said sequence contacts being connected between one of said motor controllers and said pressure switch,
the other of said sequence contacts being connected between the other of said motor controllers and said low pressure switch,
and another pressure switch connected between a point between said one sequence contact and said one controller and a point between said other sequence contact and said other controller.

2. In a system containing gas,
a pair of compressors for maintaining said gas at a predetermined pressure,
and control means for effecting alternative lead duty and lag duty operation of said compressors comprising,
first means for starting one compressor at a first pressure level and for stopping it at a second pressure level which is higher than said first pressure level,
second means for starting the other compressor at said first pressure level when the pressure subsequently falls to said first pressure level and for stopping it at said second pressure level,
said first and second means comprising a first pressure switch and a sequence relay having only one pair of sequence contacts and a coil,
said first and second means further comprising first and second motor controllers, respectively, and wherein each motor controller comprises a single auxiliary contact in series circuit with the coil of said sequence relay,
and third means for starting the other compressor at a third pressure level which is lower than said first pressure level and for stopping it at a fourth pressure level which is between said first and second pressure levels.

References Cited

UNITED STATES PATENTS

| | | | |
|---|---|---|---|
| 2,147,073 | 2/1939 | Wood et al. | |
| 2,042,169 | 5/1936 | Cook | 103—11 |
| 1,982,578 | 11/1934 | Durdin | 103—11 |
| 2,970,744 | 2/1961 | Hines | 230—2 |
| 3,035,757 | 5/1962 | Poore et al. | 230—2 |
| 3,060,858 | 10/1962 | Shoosmith | 103—11 |
| 3,292,547 | 12/1966 | Ward | 103—11 |
| 3,294,023 | 12/1966 | Vegue et al. | 103—11 |
| 3,285,181 | 11/1966 | Howard | 103—11 |

WILLIAM L. FREEH, Primary Examiner

U.S. Cl. X.R.

230—17